Aug. 15, 1939.   D. L. BEEMAN   2,169,867
CONTROL OF ELECTRIC SWITCHES
Filed July 6, 1938
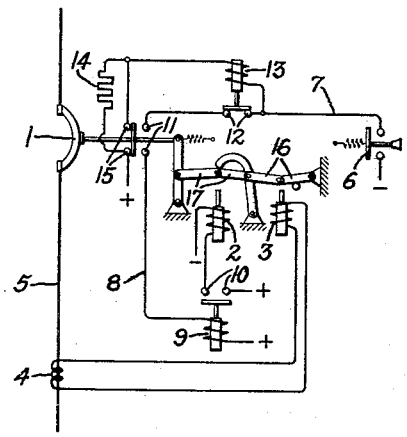
Inventor:
Donald L. Beeman,
by Harry E. Dunham
His Attorney.

Patented Aug. 15, 1939

2,169,867

UNITED STATES PATENT OFFICE 2,169,867

CONTROL OF ELECTRIC SWITCHES

Donald L. Beeman, Scotia, N. Y., assignor to General Electric Company, a corporation of New York Application July 6, 1938, Serial No. 217,687

9 Claims. (Cl. 175—294)

My invention relates to improvements in the control of electric switches and more particularly circuit breakers which are opened automatically on the occurrence of abnormal circuit conditions and which are arranged to be closed by suitable control switching means to effect the energization of electromagnetic operating means for closing the circuit breakers.

If the control switching means is maintained in the circuit closing position after the circuit breaker closes and the circuit breaker immediately opens, due to an abnormal condition on the circuit it controls or failure of the latching mechanism, the circuit breaker operating means is again energized as soon as the circuit breaker is open and consequently the circuit breaker is reclosed. Under such conditions, the circuit breaker may continue to open and close indefinitely. This so-called pumping action, if permitted, is practically certain to result in serious damage to the circuit breaker and other apparatus associated with the circuit which it controls.

An object of my invention is to provide an improved arrangement for preventing the repeated opening and closing of a circuit breaker under conditions such as those mentioned.

In accordance with my invention, the circuit breaker electromagnetic operating means, after one reclosing operation, is rendered inoperative to reclose the circuit breaker, as long as the control switching means is held in the circuit closing position, by a device which, although energized when the control switching means is closed while the circuit breaker is open, does not become operatively energized until the circuit breaker closes and is thereafter maintained in the operated condition as long as the control switching means is closed even though the circuit breaker subsequently opens.

My invention will be better understood from the following description when considered in connection with the accompanying drawing, and its scope will be pointed out in the appended claims.

In the single figure of the accompanying drawing, I have diagrammatically illustrated an embodiment of my invention as applied to a latched-closed type of trip-free circuit breaker 1 which is provided with electromagnetic closing means illustrated simply as a solenoid mechanism or closing coil 2 although any suitable motor mechanism may be used as will be obvious to those skilled in the art. The circuit breaker 1 is also provided with suitable fault responsive tripping means such as a trip coil 3 which, as shown, is connected to be energized from a current transformer 4 in the circuit 5 controlled by the circuit breaker.

For effecting the closing operation of the circuit breaker 1, there is provided a closing control circuit comprising a closing control switch 6, conductors 7 and 8, and a closing control relay 9. This is the general practice today instead of including the closing mechanism itself directly in the control circuit. The control relay 9, whose contacts 10 are designed to carry the heavy d—c current incidental to the closing operation, controls the circuit of the closing coil 2. The control switch 6 may be either manually or automatically operated. In the latter case, it may be provided with a seal-in feature to insure energization of the closing control circuit long enough to latch the breaker, but, as this constitutes no part of my invention and is, moreover, well known to the art, I have not illustrated it. In order to interrupt the circuit of the closing control relay 9, the closing control circuit may also include the contacts 11 of a circuit breaker 'b' auxiliary switch which is closed when the circuit breaker is open and vice versa.

In order to prevent reclosing of the circuit breaker as long as the control switch 6 is held closed which would happen when the circuit breaker is closed, for example on overload, I provide in accordance with my invention improved means for preventing more than one circuit breaker closing operation for one closing operation of the control switch. As shown, this means comprises a pump-free switch including contacts 12 in series in the closing control circuit and an electromagnetic device or actuating means 13 therefor comprising a winding in series with the control switch 6. Further, in accordance with my invention, I include in the energizing circuit of the device 13 means for limiting the current flow therein upon the closure of the control switch 6 to an amount insufficient to actuate the electromagnetic device 13 to open the contacts 12 until the circuit breaker is closed and thereafter to allow sufficient current flow to maintain the device 13 in the switch opening position independently of the circuit controlling position of the circuit breaker 1 as long as the control switch remains in the closed position. As shown, the current limiting means is a resistance 14 connected in series in the energizing circuit of the electromagnetic device 13 and in parallel with the contacts 15 of an 'a' circuit breaker auxiliary switch which is closed when the circuit breaker is closed and open when the circuit breaker is open.

Assuming the parts positioned as shown on the drawing and that an overcurrent condition exists on the circuit 5 sufficient to actuate the tripping device 3, this device will collapse the tripping toggle 16 upwardly thereby permitting the opening of the circuit breaker and the downward collapse of the operating toggle 17. These toggles are merely shown schematically for the purpose of illustrating a trip-free circuit breaker, examples of which are well known to the art. When the circuit breaker is opened, the contacts 15 are opened and the contacts 11 closed. The closure of the control switch 6 will now complete the circuit of the closing control relay 9 through the contacts of the control switch 6, the contacts 12 of the pump-free switch 13, and the contacts 11 of the circuit breaker 'b' auxiliary switch. The operation of the closing control relay 9 to close its contacts 10 completes the circuit of the closing coil 2 whereupon the closing toggle 17 is moved upward over center to close the circuit breaker. Prior to closure of the circuit breaker 'a' auxiliary switch contacts 15, there is insufficient current flow in the energizing circuit of the electromagnetic device 13 to pick up this device or, in other words, to open the contacts 12, due to the current limiting action of the resistance 14. However, upon closure of the 'a' auxiliary switch contacts 15, the current limiting device 14 is short-circuited and sufficient current flows in the circuit of the electromagnetic device 13 to cause this device to be actuated and open its contacts 12. Thereupon, as long as the control switch is held in the closing position, the device 13 cannot reclose its contacts 12 even though the circuit breaker is tripped out immediately and thereby connects the resistance 14 in series with the winding 13. Since there is thus established in the closing control circuit a break which will be maintained as long as the control switch 6 is held closed, no reclosure of the circuit breaker can occur until the control switch is first opened to effect deenergization and consequent drop-out of the electromagnetic pump-free device 13.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States is:

1. In a control system for effecting the closing operation of a trip-free circuit breaker provided with electromagnetic closing means and an 'a' auxiliary switch, means for effecting the energization of said closing means including a circuit and two serially related switches therein, an electromagnetic device for effecting the opening of one of said switches, and an energizing circuit for controlling the operation of said device including the other of said switches and a current limiting means in series therewith and in parallel with said 'a' switch, the ohmic value of said current limiting means being such as to cause a switch opening operation of said device only when the circuit breaker auxiliary switch is closed while said other switch is in the closed position and thereafter to maintain the device in the switch opening operated condition independently of the circuit controlling position of the circuit breaker as long as said other switch continues in the closed position.

2. In a control system for effecting the closing operation of a circuit breaker provided with electromagnetic closing means and an auxiliary switch movable in response to operation of the circuit breaker so as to be closed when the circuit breaker is closed and open when the circuit breaker is open, means for effecting the energization of said closing means including a circuit and two serially related switches therein, an electromagnetic device for opening one of said switches and an energizing circuit for controlling the operation of said device including the other of said switches and a current limiting means in series, said current limiting means being connected to be short-circuited by said auxiliary switch upon the closing thereof and being of such a current limiting value as to cause a switch opening operation of said device only when the circuit breaker is closed while said other switch is closed and thereafter to maintain the device in the switch opening operated condition independently of the circuit controlling position of the circuit breaker as long as said other switch continues in the closed position.

3. In a control system for effecting the closing operation of a circuit breaker provided with electromagnetic closing means and an auxiliary switch movable in response to operation of the circuit breaker so as to be closed when the circuit breaker is closed and open when the circuit breaker is open, means for effecting the energization of said closing means including a control circuit and a control switch and a pump-free switch connected in series in said circuit, and an energizing circuit for controlling the operation of said pump-free switch including said control switch and a resistance in series therewith and in parallel with said auxiliary switch, said resistance having an ohmic value such as to permit an effective switch operating energization of said energizing circuit to open said pump-free switch only when the circuit breaker auxiliary switch is closed while the control switch is in the closed position and thereafter to maintain the pump-free switch in the open position independently of the circuit controlling position of the circuit breaker as long as the control switch remains in the closed position.

4. In a control system for effecting the closing operation of a circuit breaker provided with electromagnetic closing means and an 'a' auxiliary switch, means for effecting the energization of said closing means including a control circuit, and a control switch and a pump-free switch connected in series in said circuit, an electromagnetic device for effecting the opening operation of said pump-free switch, an energizing circuit for controlling the operation of said device including said control switch in series therewith, and means in said energizing circuit for limiting the current flow in the winding of said device upon the closure of the control switch to an amount insufficient to actuate the device to the switch opening position until the circuit breaker auxiliary switch is closed and thereafter to allow sufficient current flow to maintain the device in the switch opening position independently of the circuit controlling position of the circuit breaker as long as the control switch remains in the closed position.

5. In a control system for effecting the closing operation of a circuit breaker provided with electromagnetic closing means and an 'a' auxiliary switch, means for effecting the energization of said closing means including a control circuit and a control switch and a pump-free switch connected in series in said circuit, an electromagnetic device for effecting the opening operation of said pump-free switch, an energizing circuit for controlling the operation of said device including said control switch in series therewith, and a resistance in series in said energizing circuit and in parallel with said 'a' auxilary switch for limiting the current flow in the winding of said device upon closure of the control switch to an amount insufficient to actuate the device to the switch opening position until the circuit breaker auxiliary switch is closed and thereafter to allow sufficient current flow to maintain the device in the switch opening position independently of the circuit controlling position of the circuit breaker as long as the control switch remains closed.

6. In combination, a circuit breaker, electromagnetic means for closing said circuit breaker, an auxiliary switch actuated in response to the actuation of said circuit breaker so as to be closed when the circuit breaker is closed and open when the circuit breaker is open, means for effecting the energization of said closing means including a closing circuit and two serially related switches therein, energizing means for effecting an opening operation of one of said switches comprising a circuit including the other of said switches in series therein, a series resistance in said circuit in series with the other of said switches and in parallel with said auxiliary switch, the ohmic vaue of said resistance being such as to permit an effective switch opening energization of said circuit only when the circuit breaker auxiliary switch is closed while said other switch is in the closed position and thereafter to maintain said energizing means in the switch opening condition independently of the circuit controlling position of the circuit breaker as long as said other switch continues in the closed position.

7. In a control system for effecting the closing operation of a trip-free circuit breaker, provided with electromagnetic closing means and an auxiliary switch actuated in response to operation of the circuit breaker so as to be closed when the circuit breaker is closed and open when the circuit breaker is open, means for effecting the energization of said closing means including a closing circuit and control switch and a pump-free switch in series in said circuit, means for opening said pump-free switch including a winding, an energizing circuit for effecting an opening operation of said pump-free switch opening means including said winding and a resistance in series with said control switch and in parallel with said auxiliary switch, the ohmic value of said resistance being such as to permit sufficient current flow in said winding to effect an opening operation of said pump-free switch only when the circuit breaker auxiliary switch is closed while the control switch is in the closed position and thereafter to permit enough current flow in said winding to maintain the pump-free switch in the open position independently of the circuit controlling position of the circuit breaker as long as the control switch remains in the closed position.

8. In a control system for effecting the closing operation of a circuit breaker provided with electromagnetic closing means, means for effecting the energization of said closing means including a control circuit and control switching means and pump-free switching means each having contacts in series relation in said control circuit, electromagnetic means including a single winding for actuating said pump-free switching means to open its contacts in the control circuit, means responsive to the closing of the circuit breaker while said control switching means is closed for energizing said winding to effect the operation of said pump-free switching means to open the contacts in the control circuit, and means for maintaining said winding energized to keep the contacts of said pump-free switching means in said control circuit open as long as said winding is energized independently of the circuit controlling position of the circuit breaker.

9. In a control system for effecting the closing of a circuit breaker provided with electromagnetic closing means, means for effecting the energization of said closing means including a control circuit, and control switching means and pump-free switching means each having contacts in series relation in said control circuit, electromagnetic means having a single winding for actuating said pump-free switching means to open its contacts in the control circuit, a circuit for said winding including said control switching means and having a resistance when the circuit breaker is open and the control switch is closed such as to prevent the circuit opening actuation of said pump-free switching means by said winding, and means responsive to the closing of the circuit breaker for decreasing the resistance of said winding circuit sufficiently to cause the circuit opening actuation of said pump-free switching means upon the closing of the circuit breaker whereby to maintain the contacts of the pump-free switching means open regardless of the opening of the circuit breaker while the control switching means remains closed.

DONALD L. BEEMAN.